United States Patent [19]

Knupp, Jr.

[11] Patent Number: 4,515,695

[45] Date of Patent: May 7, 1985

[54] EXTRACTION OF SUBSTANCES FROM AQUEOUS SOLUTION

[75] Inventor: John L. Knupp, Jr., Newark, Del.

[73] Assignee: E.I. Du Pont de Nemours and Company, Wilmington, Del.

[21] Appl. No.: 555,487

[22] Filed: Nov. 28, 1983

[51] Int. Cl.$^3$ .............................................. A23F 3/20
[52] U.S. Cl. ................................... 210/634; 426/428
[58] Field of Search ................. 203/49, 51; 210/634; 426/427, 428

[56] References Cited

U.S. PATENT DOCUMENTS

| | | | |
|---|---|---|---|
| 3,669,679 | 6/1972 | Panzer et al. | 99/70 |
| 3,769,033 | 10/1973 | Panzer et al. | 426/428 |
| 3,770,456 | 10/1973 | Roselius et al. | 426/354 |
| 3,806,619 | 4/1974 | Zosel | 203/49 |
| 4,255,458 | 3/1981 | Roselius et al. | 426/424 |
| 4,322,445 | 3/1982 | Peter et al. | 426/312 |
| 4,349,415 | 9/1982 | DeFilippi et al. | 210/634 |

OTHER PUBLICATIONS

"Heat Transfer Consideration in Utilizing Solar and Geothermal Energy", Michel, J. W. Alternative Energy Sources 1977, (Pub. 1978)6 2801–2825.
"Ocean Thermal Energy Conversion (OTEC) Plant Working Fluid Study", Nelson, M. I. Proc. Condens. Pap.-Miami Int. Conf. Alternative Energy Sources 1977, 107–108.
"Report on Subacute Toxicological Studies with Several Fluorocarbons in Rats and Dogs by Inhalation" Leuschner, F. Arznein-Forsch, (1983), 33(10) 1475–1476.
"Acute Inhalation Toxicity of Some Halogenated and Nonhalogenated Hydrocarbons", Clark, D. G.; Hum. Toxicol, 1982 1(3) 239–247.
"Viscosity of Liquid Refrigerants and Refrigerant Mixtures" Heide, R. Luft-Kaeltetech, 1981, 17(1), pp. 7–10.
"Optimum Properties of Working Fluids for Solar Powered Heat Pumps" Stiel, L. I. Rec. Intersoc. Energy Convers., Eng. Conf., 10th, 1975, 171–177.

*Primary Examiner*—Richard V. Fisher
*Assistant Examiner*—W. Gary Jones

[57] ABSTRACT

Extraction of dissolved substances from aqueous solution by contacting the solution with a mixture of fluorocarbon solvents comprising normally gaseous monochlorodifluoromethane and normally liquid trichlorotrifluoroethane. Contact is carried out under pressure which maintains the solvent mixture in the liquid state. The aqueous solution and the solvent mixture form two phases upon standing. Separation of the phases and release of pressure on the fluorocarbon solvent liberates the monochlorodifluoromethane from the mixture, and extracted material insoluble in trichlorotrifluoroethane either precipitates or forms a second liquid layer. The insoluble material is then separated from the trichlorotrifluoromethane.

2 Claims, No Drawings

EXTRACTION OF SUBSTANCES FROM AQUEOUS SOLUTION

BACKGROUND OF THE INVENTION

1. Field of the Invention

This invention relates to the extraction of substances from aqueous solution and to mixtures of fluorocarbon solvents used in such extraction.

2. Description of the Prior Art

Many chemical processes as well as other types of industrial operations require the recovery of substances from aqueous solution. One means for accomplishing such recovery is by solvent extraction. In such a procedure, the aqueous solution is contacted with an immiscible solvent in which the dissolved material (solute) also exhibits solubility. Since the two liquids are immiscible, some form of agitation, such as stirring, shaking or counter-current flow is used to bring them into intimate contact whereupon solute dissolves in the non-aqueous phase. If the liquids are then allowed to stand, two distinct layers are formed which can be separated by decantation.

Solvent extraction as above described has long been used to remove dissolved materials from aqueous solution and is a common separation step in laboratory procedures. It provides a simple and convenient means for removing by-product from a reaction medium. However, if the solute is the desired end product, or if it is necessary to recover solute for disposal or re-use—as would probably be the case in an industrial operation—a further separation step must be carried out. In many instances, this would be some form of distillation separation, which means the expenditure of considerable energy and higher production costs.

SUMMARY OF THE INVENTION

The present invention provides a solvent extraction process in which the extracted material can be simply and conveniently recovered without resort to expensive, energy consuming separation means, such as distillation. This invention also provides a novel solvent system which performs in a unique manner in a solvent extraction process. The solvent system of the present invention comprises a mixture of monochlorodifluoromethane and 1,1,2-trichloro-1,2,2-trifluoroethane. These two fluorocarbons are commercial products which are respectively referred to in the industry as FC-22 and FC-113. These latter designations will be used interchangeably with the names of the chemical compounds in referring to these fluorocarbons. FC-113 which has a boiling point of 47.6° C. (117.6° F.) is a liquid at ordinary room temperature, and it is employed as an industrial solvent, particularly in the electronics industry for cleaning printed circuit boards. It is also used in other industrial cleaning applications and as a drycleaning solvent. FC-22 with a boiling point of −40.8° C. (−41.4° F.) is a gas at ambient temperatures, and it is used as a refrigerant and as a propellant in aerosol products.

According to the present invention, an aqueous solution containing a solute that is essentially insoluble in FC-113 and soluble in FC-22 is contacted with a mixture of FC-22 and FC-113 at a pressure sufficient to maintain the mixture in the liquid state. During such contact which can be brought about by stirring, shaking or a mixing of liquid streams, solute is extracted from the aqueous solution by the fluorocarbon mixture. Since the aqueous solution and the fluorocarbons are immiscible, they will separate upon standing making it possible to separate the two phases by decantation which can be carried out in a water separator, if desired. When the two phases are separated, the pressure on the fluorocarbon mixture is released thus allowing the FC-22 to vaporize whereupon the extracted solute will precipitate in the FC-113 or form a second liquid layer. The solute can then be separated from the liquid FC-113 by conventional means, such as filtration or decantation.

The process of this invention can be used to recover materials in many types of operations. For example, it can be used in the recovery of caffeine that is obtained as an aqueous solution during the production of decaffeinated coffee. Other operations in which the invention can be used include recovery of propylene glycol and recovery operations in the pharmaceutical industry.

DETAILED DESCRIPTION OF THE INVENTION

The process of the present invention is illustrated in terms of describing how the present invention would be useful in a continuous process for the recovery of caffeine from an aqueous solution obtained by treating green coffee beans with hot water. The coffee beans are soaked in boiling water for one hour in a ratio of 1 pound of beans per 4.5 pounds of water. A stream of the aqueous solution that is obtained is fed into an extraction vessel equipped with an agitator and maintained at 57° C. and 80 psig. In the reactor, the aqueous solution is contacted with a mixture of about 13 wt % FC-22 and 87 wt % FC-113. The reaction vessel is staged so that the aqueous phase is contacted with fluorocarbon solvent phase in several separate zones in a counter current flow in which fresh solvent entering the extractor first contacts that portion of the aqueous medium that has resided longest in the reactor. Staging in this manner maximizes the extraction of the caffeine by the fluorocarbon solvent. Residence time in the extraction vessel can be determined by those skilled in the art and will vary depending upon the size and design of the vessel and the degree and type of agitation used. The feed rates are such as to provide a solvent/aqueous solution in a weight ratio of 3:1. The exit stream from the extractor passes to a water separator where the two liquid phases are separated, and the aqueous phase with caffeine removed is returned to the vessel where the green coffee beans are contacted with water to dissolve the caffeine in the beans. The fluorocarbon stream from the solvent extractor goes to a flash evaporator maintained at ambient temperature and pressure where the low boiling FC-22 vaporizes. The caffeine crystallizes in the FC-113 liquid and is recovered by filtration. In order to insure maximum recovery of caffeine, there should be a hold-up time of at least five minutes prior to filtration so that the caffeine has time to nucleate and crystallize out of the FC-113 solvent. FC-22 vapor from the flash evaporation is returned to the liquid state by vapor compression and condensation in an air-cooled condenser. The condensed FC-22 and the filtered FC-113 are then pumped to the extractor vessel for re-use.

The proportion of FC-22 to FC-113 in the fluorocarbon mixture can be varied. Generally, the range of proportions is 10 to 90 wt % FC-22 and 90 to 10 wt % FC-113. Preferred compositions are in the range of 13 to 32 wt % FC-22 and 87 to 68 wt % FC-113. A specific composition that is preferred comprises 13 wt % FC-22 and 87 wt % FC-113. The proportion of fluorocarbon solvent mixture to aqueous solution can range from 1:1 to 10:1 by weight.

The temperature at which the extraction process is carried out can vary over a considerable range. Temperatures above 20° C. are necessary so as to avoid the formation of the hydrate of FC-22. The pressure capacity of the equipment will determine the upper temperature limit. Temperatures as high as 85° C. can be used in conventional low pressure plant equipment. Heating will generally increase the amount of solute extracted. However, since conservation of energy is usually a consideration, it is recommended that for most cases the extraction can be carried out without the application of heat. Moreover, in many uses for the process of the present invention, the aqueous solution is already at elevated temperature so that further heating would not provide sufficient gain in extraction efficiency to justify the cost of supplying additional heat. Temperatures in the range of 20° to 85° C. are suitable for most extractions. Pressure is not a critical consideration so long as it is sufficient to maintain the FC-22 in the liquid state. Pressures in the range of 130 to 180 psig are suitable with a range of 50 to 120 psig being preferred.

EXAMPLE 200 g of a 2 wt % caffeine in water solution is agitated with 300 g of a 13/87 wt % FC-22/FC-113 mixture for two minutes at 40° C. in a glass pressure-reaction vessel. Heating is effected by a water bath, and autogenous pressure is 50 psig. Upon allowing to stand, the mixture separates into two layers; the water layer on the top and the fluorocarbon layer on the bottom. The fluorocarbon layer is withdrawn through a valve at the bottom of the vessel. At ambient pressure, the FC-22 flashes leaving the FC-113/solute mixture. The FC-113 is filtered to recover caffeine. Water layer analysis indicates that 30% of the caffeine is extracted by the fluorocarbon mixture.

I claim:

1. In a process for extracting solute from an aqueous solution by contacting the solution with an immiscible solvent in which said solute is soluble, the improvement which comprises contacting said aqueous solution containing a solute that is insoluble in 1,1,2-trichloro-1,2,2-triflurorethane with a mixture of 10 to 90 wt % monochlorodifluoromethane and 90 to 10 wt % 1,1,2-trichloro-1,2,2-trifluoroethane at a pressure sufficient to maintain the mixture in the liquid state, allowing the contacted liquids to return to a quiescent state after said contact thus forming separate liquid layers, separating the liquid layers, vaporizing the monochlorodifluoroethane in the fluorocarbon solvent phase by reducing pressure thereby causing the solute to precipitate or form a second liquid layer, and separating said solute from the 1,1,2-trichloro-1,2,2-trifluoroethane.

2. The process of claim 1 in which the aqueous solution contains caffeine.

* * * * *